United States Patent
Nyuu et al.

(10) Patent No.: US 10,710,764 B2
(45) Date of Patent: Jul. 14, 2020

(54) STRUCTURE HAVING A GEL-LIKE COATING ON THE SURFACE THEREOF

(71) Applicants: TOYO SEIKAN CO., LTD., Tokyo (JP); TOYO SEIKAN GROUP HOLDINGS, LTD., Tokyo (JP)

(72) Inventors: Keisuke Nyuu, Yokohama (JP); Yoshiaki Okada, Yokohama (JP); Tomoyuki Miyazaki, Yokohama (JP); Yosuke Akutsu, Yokohama (JP); Shinya Iwamoto, Yokohama (JP)

(73) Assignees: TOYO SEIKAN CO., LTD., Tokyo (JP); TOYO SEIKAN GROUP HOLDINGS, LTD., Tokyo (JP)

( * ) Notice: Subject to any disclaimer, the term of this patent is extended or adjusted under 35 U.S.C. 154(b) by 205 days.

(21) Appl. No.: 15/571,054

(22) PCT Filed: Mar. 29, 2016

(86) PCT No.: PCT/JP2016/060136
§ 371 (c)(1),
(2) Date: Nov. 1, 2017

(87) PCT Pub. No.: WO2016/185804
PCT Pub. Date: Nov. 24, 2016

(65) Prior Publication Data
US 2018/0162580 A1    Jun. 14, 2018

(30) Foreign Application Priority Data

May 21, 2015  (JP) .................................. 2015-103840

(51) Int. Cl.
*B65D 1/02*    (2006.01)
*C09D 7/63*    (2018.01)
(Continued)

(52) U.S. Cl.
CPC .............. *B65D 1/0207* (2013.01); *B32B 7/12* (2013.01); *B32B 27/08* (2013.01); *B32B 27/306* (2013.01);
(Continued)

(58) Field of Classification Search
CPC . B32B 2439/70; B32B 33/00; B32B 2255/10; B32B 27/08; B32B 27/306;
(Continued)

(56) References Cited

U.S. PATENT DOCUMENTS

2005/0220692 A1    10/2005  Mangold et al.
2005/0272826 A1    12/2005  Mangold et al.
(Continued)

FOREIGN PATENT DOCUMENTS

CN    101198748 A    6/2008
CN    102225769 A    10/2011
(Continued)

OTHER PUBLICATIONS

Communication dated Mar. 14, 2019, from the European Patent Office in counterpart application No. 16796198.6.
(Continued)

*Primary Examiner* — Yan Lan
(74) *Attorney, Agent, or Firm* — Sughrue Mion, PLLC

(57) ABSTRACT

A structure forming a gel-like coating (3) on a surface of a base material (1) that is formed in a predetermined shape, the gel-like coating including fine solid particles of a grain size of not more than 50 μm and an oily liquid.

6 Claims, 1 Drawing Sheet

(51) Int. Cl.

| | | |
|---|---|---|
| *C09D 191/00* | (2006.01) | |
| *C08J 7/06* | (2006.01) | |
| *B32B 27/08* | (2006.01) | |
| *B32B 7/12* | (2006.01) | |
| *B65D 85/72* | (2006.01) | |
| *B65D 65/40* | (2006.01) | |
| *B65D 25/14* | (2006.01) | |
| *B65D 23/02* | (2006.01) | |
| *B32B 33/00* | (2006.01) | |
| *B32B 27/30* | (2006.01) | |
| *B32B 27/32* | (2006.01) | |
| *C08K 5/00* | (2006.01) | |

(52) U.S. Cl.
CPC .............. *B32B 27/32* (2013.01); *B32B 33/00* (2013.01); *B65D 1/02* (2013.01); *B65D 23/02* (2013.01); *B65D 25/14* (2013.01); *B65D 65/40* (2013.01); *B65D 85/72* (2013.01); *C08J 7/06* (2013.01); *C09D 7/63* (2018.01); *C09D 191/00* (2013.01); *B32B 2255/10* (2013.01); *B32B 2439/70* (2013.01); *C08J 2323/06* (2013.01); *C08J 2491/00* (2013.01); *C08K 5/00* (2013.01); *C08K 2201/005* (2013.01)

(58) Field of Classification Search
CPC .. B32B 27/32; B32B 7/12; B32B 1/02; B32B 2307/746; B65D 1/02; B65D 1/0207; B65D 23/02; B65D 25/14; B65D 65/40; B65D 85/72; C08J 2323/06; C08J 2491/00; C08J 7/06; C08K 2201/005; C08K 5/00; C09D 191/00; C09D 7/63
See application file for complete search history.

(56) References Cited

U.S. PATENT DOCUMENTS

| | | |
|---|---|---|
| 2007/0015652 A1 | 1/2007 | Mangold et al. |
| 2008/0190574 A1 | 8/2008 | Baker et al. |
| 2010/0004373 A1 | 1/2010 | Zhu et al. |
| 2013/0032316 A1 | 2/2013 | Dhiman et al. |
| 2013/0034695 A1 | 2/2013 | Smith et al. |
| 2014/0147627 A1 | 5/2014 | Aizenberg et al. |
| 2014/0187666 A1 | 7/2014 | Aizenberg et al. |
| 2014/0290731 A1 | 10/2014 | Aizenberg et al. |
| 2014/0290732 A1 | 10/2014 | Aizenberg et al. |
| 2015/0108032 A1 | 4/2015 | Akutsu et al. |
| 2015/0175317 A1 | 6/2015 | Imai et al. |
| 2015/0360820 A1 | 12/2015 | Akutsu et al. |
| 2016/0075117 A1 | 3/2016 | Akutsu et al. |
| 2016/0130487 A1 | 5/2016 | Iwamoto et al. |
| 2016/0152786 A1 | 6/2016 | Akutsu et al. |

FOREIGN PATENT DOCUMENTS

| | | |
|---|---|---|
| CN | 102239224 A | 11/2011 |
| CN | 103359954 A | 10/2013 |
| CN | 104497729 A | 4/2015 |
| CN | 104619603 A | 5/2015 |
| EP | 1 582 099 A1 | 10/2005 |
| EP | 3 287 388 A1 | 2/2018 |
| JP | 2001-072427 A | 3/2001 |
| JP | 2005-46098 A | 2/2005 |
| JP | 2007-204351 A | 8/2007 |
| JP | 2013-247881 A | 12/2013 |
| JP | 2015-010221 A | 1/2015 |
| JP | 5680900 B2 | 3/2015 |
| WO | 2012/100099 A2 | 7/2012 |
| WO | 2013/022467 A2 | 2/2013 |
| WO | 2014/010534 A1 | 1/2014 |
| WO | 2014/038701 A1 | 3/2014 |
| WO | 2014/126010 A1 | 8/2014 |
| WO | 2014/145414 A1 | 9/2014 |
| WO | 2014/188883 A1 | 11/2014 |
| WO | 2015/012358 A1 | 1/2015 |

OTHER PUBLICATIONS

Japanese Notification of Reasons for Refusal issued in JP 2016-168863 dated Sep. 1, 2017.
International Search Report of PCT/JP2016/060136 dated Jul. 5, 2016.
Communication dated Dec. 17, 2018, from the European Patent Office in counterpart European Application No. 16796198.6.
Communication dated Sep. 19, 2018, from State Intellectual Property Office of the P.R.C. in counterpart application No. 201680029547.1.

STRUCTURE HAVING A GEL-LIKE COATING ON THE SURFACE THEREOF

CROSS REFERENCE TO RELATED APPLICATIONS

This application is a National Stage of International Application No. PCT/JP2016/060136 filed Mar. 29, 2016, claiming priority based on Japanese Patent Application No. 2015-103840 filed May 21, 2015, the contents of all of which are incorporated herein by reference in their entirety.

TECHNICAL FIELD

This invention relates to a structure having a gel-like coating on the surface thereof. More specifically, the invention relates to a structure that can be favorably used as a container.

BACKGROUND ART

The containers for containing liquid contents must be capable of favorably discharging the contents irrespective of the materials forming the containers. Discharging the content is not almost of a problem when the liquids having low viscosities such as water and the like are contained. Discharging the content, however, becomes a serious problem when the content is a highly viscous substance such as mayonnaise or ketchup irrespective of the plastic container or the glass container. Namely, the contents of this kind are not quickly discharged despite the container is tilted. Besides, the contents tend to stay on the container wall and cannot be all recovered. Particularly, the content stays in considerable amounts on the bottom of the container and is not all recovered.

In recent years, there have been proposed various kinds of technical arts for improving slipping properties to viscous substances by forming an oil film on the surfaces of the formed bodies such as containers and the like (e.g., see patent documents 1 and 2).

According to the above technical arts, the slipping property can be strikingly improved as compared to the cases of adding an additive such as lubricant to the synthetic resin that forms the surfaces of the formed bodies, and attention has now been paid thereto.

According to the above means for improving surface properties by forming the oil film on the surfaces of the base materials as described above, however, the life for effectively exhibiting the slipping property relying on the oil film does not last long. After the passage of long periods of time, therefore, the slipping property decreases and, depending upon the cases, the content adheres to the surfaces. This tendency becomes conspicuous particularly when the substance that falls down along the surface is an emulsified product or, specifically, mayonnaise-like food containing little oil components.

The present applicant has previously proposed a packing container for containing oil-in-water type emulsified products as represented by mayonnaise-like foods, the packing container having an oil film formed on the inner surface thereof that comes in contact with the oil-in-water type emulsified products (Japanese Patent Application No. 2014-023425).

The present applicant has also previously proposed a packing material having a liquid film formed on the inner surface thereof that comes in contact with the content, the liquid film being dispersed with solid particles of a grain size of not larger than 300 am (Japanese Patent Application No. 2014-126877).

However, even the above arts previously proposed by the present applicant are not still effectively solving the problem of a decrease in the slipping property with the passage of time.

PRIOR ART DOCUMENTS

Patent Documents

Patent document 1: WO2012/100099
Patent document 2: WO2013/022467

OUTLINE OF THE INVENTION

Problems that the Invention is to Solve

It is, therefore, an object of the present invention to provide a structure forming a lubricating coating thereon for improving the slipping property such as slide-down property, the structure continuously exhibiting the improved slipping property maintaining stability.

Another object of the present invention is to provide a structure that can be used as a container for containing emulsified products as contents, the structure excellently and continuously exhibiting the slipping property to the emulsified products.

Means for Solving the Problems

The present inventors have conducted experiments extensively concerning the slipping property to viscous substances. As a result, the inventors have discovered that upon forming, on the surface of the structure, a gel-like coating by using an oily liquid mixed with fine solid particles, the structure exhibits improved slipping property to various kinds of viscous substances and, specifically, to the emulsified products maintaining stability over extended periods of time, and have thus completed the present invention.

According to the present invention, there is provided a structure forming a gel-like coating on a surface of a base material that is formed in a predetermined shape, the gel-like coating including fine solid particles of a grain size of not more than 50 μm and an oily liquid.

In the structure of the present invention, it is desired that:
(1) The gel-like coating has a viscosity of 35 to 250 mPa·s (25° C.) as measured at a rotational frequency of 20 rpm;
(2) The oily liquid forming the gel-like coating has an angle of contact (20° C.) of not more than 45 degrees with respect to the surface of the base material and a viscosity (25° C.) of not more than 100 mPa·s;
(3) The oily liquid is an edible oil;
(4) The fine solid particles are fat-and-oil particles;
(5) The gel-like coating is formed on the surface of the base material in an amount of 1.00 to 3.70 mg/cm$^2$;
(6) The surface of the base material is formed of a synthetic resin or a glass; and
(7) The base material is a container and the gel-like coating is formed on an inner surface thereof with which a content comes in contact.

In the present invention, the gel-like coating is a non-Newtonian fluid and its viscosity can be measured by using a rotary viscometer. The oily liquid, on the other hand, is a Newtonian fluid and its viscosity can be measured by using not only the rotary viscometer but also by using any viscometer that is suitably selected depending upon, the viscosity of the oily liquid.

Effects of the Invention

The structure of the present invention is provided, on the surface thereof, with a gel-like coating that comprises an oily liquid and fine solid particles. Therefore, the structure not only exhibits excellent slipping property (initial slipping property) to various viscous water-containing substances but also effectively prevents a decrease in the properties after the passage of time and, therefore, excellently maintains the slipping property. Such excellent initial slipping property and maintaining the slipping property are also continuously exhibited even for such viscous emulsified products as mayonnaise-like foods and the like.

In the structure used, for example, for a container which in this case is the base material, a predetermined gel-like coating is formed on the inner surface of the container (base material) according to the present invention. Namely, as will be demonstrated in Example 1 appearing later, the mayonnaise-like food is filled in the structure. In this case, even after stored at 40° C. for two months, the activity (slipping property) is exhibited to a degree equivalent to that of just after the mayonnaise-like food is filled.

On the other hand, when no gel-like coating is formed but only the oil film is formed on the inner surface of the container (base material) by using the oily liquid that is for forming the gel-like coating, then a greatly decreased slipping property is exhibited to the content (mayonnaise-like food) after it is preserved at 40° C. for 2 weeks.

Through experiments conducted extensively, it was confirmed as a phenomenon that by forming the gel-like coating on the surface according to the present invention, excellent initial slipping property is exhibited and the slipping property is continuously exhibited. Though the technical reasons have not been clarified yet, the present inventors presume it to be as described below.

That is, when it is attempted to improve the slipping property by merely forming an oil film, the oil film is gradually scratched off from the surface thereof by the viscous water-containing substance that passes on the oil film. In the initial stage, therefore, the slipping property is effectively exhibited by the oil film. However, the oil film gradually extinguishes as the viscous water-containing substance flows on the oil film. As a result, the slipping property gradually decreases and is no more exhibited satisfactorily.

In the present invention, on the other hand, the gel-like coating is formed on the surface of the base material. When a viscous water-containing substance flows on the gel-like coating, therefore, the oily liquid is liberated in the interface where it is in contact with the viscous water-containing substance due to the stress (load) and excellent slipping property is exhibited. At the same time, on the side of the interface between the gel-like coating and the surface of the base material, the gel-like coating does not almost receive the stress (load); i.e., the gel-like coating does not move from the surface of the base material and continues to be held thereon maintaining stability. That is, the gel-like coating is not almost worn out despite the viscous water-containing substance repetitively flows on the gel-like coating. As a result, it is considered that the structure not only exhibits excellent initial slipping property but also continuously exhibits its excellent slipping property.

The structure of the present invention exhibits excellent slipping property to viscous water-containing substances and, besides, continuously exhibits excellent slipping property. Therefore, the structure of the invention can be, particularly preferably, used as a container for containing viscous liquid substances such as water-containing substances, mayonnaise, ketchup and various kinds of dressings and, specifically, for containing substances having viscosities 25° C.) of not less than 1260 mPa·s (as measured by using a tuning fork type viscometer).

MODES FOR CARRYING OUT THE INVENTION

Figure 1:
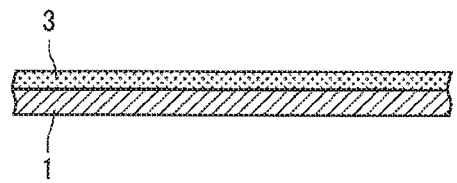
FIG. 1 It is a schematic side sectional view illustrating the surface state of a structure of the present invention.

Referring to FIG. 1, the structure of the present invention includes a base material 1 formed in a shape that meets the use and a gel-like coating 3 formed on the surface thereof.

<Base Material 1>

There is no particular limitation on the material forming base material 1 so far as it is capable of holding the gel-like coating 3 on the surface thereof. Namely, the base material 1 may be made of any material such as a resin, a glass or a metal, and may be formed in any shape to meet the use.

Specifically, from such a standpoint that the structure of the invention exhibits excellent slipping property to viscous water-containing substances owing to the gel-like coating 3, it is desired that the base material 1 has the shape of a pipe for flowing the water-containing substances, a container for containing them, and a container lid. The gel-like coating 3 is formed on the surface that comes into contact with the water-containing substances.

Besides, from the standpoint of holding the gel-like coating 3, in particular, it is most desired that the surface of the base material 1 (surface underlying the gel-like coating 3) is made of a synthetic resin.

The synthetic resin (hereinafter referred to as underlying resin) may be any thermoplastic resin or thermosetting resin that can be formed. In general, however, it is desired that the underlying resin is a thermoplastic resin from such a standpoint that it can be easily formed, it has a high degree of affinity to the oily liquid in the gel-like coating 3, and it is capable of more stably holding the gel-like coating 3 that contains the oily liquid.

As the thermoplastic resin, there can be exemplified the following resins; i.e., olefin resins such as low-density polyethylene, high-density polyethylene, polypropylene, poly 1-butene, poly 4-methyl-1-pentene, and random or block copolymers of α-olefins such as ethylene, propylene, 1-butene or 4-methyl-1-pentene, and cyclic olefin copolymers thereof;

ethylene-vinyl copolymers such as ethylene-vinyl acetate copolymer, ethylene-vinyl alcohol copolymer and ethylene-vinyl chloride copolymer;

styrene resins such as polystyrene, acrylonitrile-styrene copolymer, ABS and α-methylstyrene-styrene copolymer;

vinyl resins such as polyvinyl chloride, polyvinylidene chloride, vinyl chloride-vinylidene chloride copolymer, methyl polyacrylate and methyl polymethacrylate;

polyamide resins such as nylon 6, nylon 6-6, nylon 6-10, nylon 11 and nylon 12;

polyester resins such as polyethylene terephthalate (PET), polybutylene terephthalate, polyethylene naphthalate and copolymerized polyesters thereof;

polycarbonate resin;

polyphenylene oxide resin; and biodegradable resins such as polylactic acid and the like.

As a matter of course, it is also allowable to use a blend of the above thermoplastic resins as the underlying resin so far as it does not impair the formability.

In the invention, among the above thermoplastic resins, it is desired to use an olefin resin and a polyester resin that have been used as materials of containers for containing viscous contents, and it is most desired to use the olefin resin.

That is, as compared to the polyester resin such as PET, the olefin resin has a low glass transition point (Tg) and shows a high molecular movement at room temperature. Therefore, the oily liquid forming the gel-like coating 3 partly infiltrates into the interior of the olefin resin, and best works to hold the gel-like coating 3 on the surface maintaining stability.

Moreover, the olefin resin is highly flexible and has been used for producing squeeze-out containers (squeeze bottles) by the direct blow-forming method that will be described later. Therefore, use of the olefin resin is desirable even from the standpoint of applying the structure of the present invention to the containers of this kind.

The base material 1 may be of a single-layer structure of the thermoplastic resin as described above, or a laminate of the thermoplastic resin with a paper, or may be of a multi-layer structure of a combination of a plurality of thermoplastic resins.

The structure of the present invention exhibits excellent slipping property to viscous water-containing substances and continuously exhibits the slipping property. The structure, therefore, can be effectively applied to the use where the water-containing substances flows in contact with the gel-like coating 3 and can be, specifically, used as containers for-containing water-containing substances. That is, the base material 1 of the invention should assume the form of a container to enjoy the advantage of the present invention to a maximum degree.

Specifically, when the base material 1 assumes the form of a container with its inner surface being formed of an olefin resin or a polyester resin, there can be employed a structure in which an oxygen-barrier layer or an oxygen-absorbing layer is laminated as an intermediate layer via a layer of a suitable adhesive resin and, further, the same resin as the underlying resin (olefin resin or the polyester resin) forming the inner surface is laminated on the outer surface side thereof.

The oxygen-barrier layer in the multi-layer structure is formed by using an oxygen-barrier resin such as ethylene-vinyl alcohol copolymer or polyamide, and can be, further, blended with any other thermoplastic resins in addition to the oxygen-barrier resin so far as they do not impair the oxygen-barrier property.

Further, as described in JP-A-2002-240813, the oxygen-absorbing layer contains an oxidizing polymer and a transition metal catalyst. Due to the action of the transition metal catalyst, the oxidizing polymer is oxidized with oxygen thereby absorbing oxygen and shutting off the permeation of oxygen. The above oxidizing polymer and the transition metal catalyst have been closely described in the above JP-A-2002-240813. Therefore, though not described here in detail, representative examples of the oxidizing polymer include an olefin resin having tertiary carbon atoms (e.g., polypropylene, polybutene-1, or a copolymer thereof), a thermoplastic polyester or an aliphatic polyamide; a polyamide resin containing a xylylene group; and an ethylenically unsaturated group-containing polymer (e.g., polymer derived from a polyene such as butadiene). Further, representative examples of the transition metal catalyst include inorganic salts of transition metals such as iron, cobalt and nickel, and organic acid salts or complex salts.

The adhesive resins used for adhering the layers have been known. As the adhesive resins, for instance, there can be used an olefin resin graft-modified with a carboxylic acid such as maleic acid, itaconic acid, fumaric acid, or with an anhydride thereof, amide or ester; an ethylene-acrylic acid copolymer; an ionically crosslinked olefin copolymer; and an ethylene-vinyl acetate copolymer.

The layers may have thicknesses that are suitably determined depending upon the properties required for the layers.

It is, further, allowable to form, as the inner layer, a layer of the reground resin obtained by blending a virgin resin such as olefin resin with a scrap resin such as burr that generates at the time of forming the base material 1 of the multi-layer structure. Or it is also allowable to use, as the base material 1, a container of which the inner surface is formed by using the olefin resin or the polyester resin and of which the outer surface is formed by using the polyester resin or the olefin resin.

There is no particular limitation on the shape of the container which is used as the base material 1. Namely, the base material 1 may assume any shape depending on the material of the container, such as cup or mug, bottle, bag (pouch), syringe, pot, tray and the like. The base material 1 may have been stretch-formed, and is formed by any known method.

Figure 2:
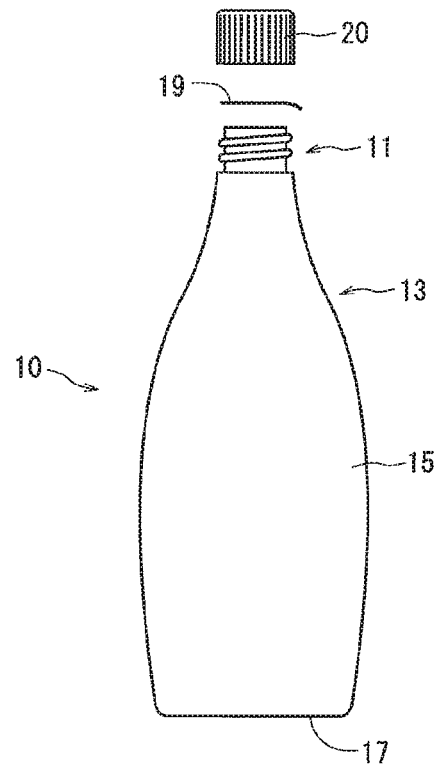
FIG. 2 It is a view showing the state of a directly blow-formed bottle which is a preferred embodiment of the structure of the present invention.

FIG. 2 shows a directly blow-formed bottle which is the most preferred embodiment of the base material. 1 of the present invention.

In FIG. 2, the bottle generally designated at 10 includes a neck portion 11 having a screw thread, a body wall 15 continuous to the neck portion 11 via a shoulder portion 13, and a bottom wall 17 that is closing the lower end of the body wall 15. The gel-like coating 3 is formed on the inner surface of the bottle (base material 1).

The bottle 10 is favorably used for containing viscous substances. Upon squeezing the body wall 15, the viscous substance contained therein can be discharged. The gel-like coating 3 is formed on the inner surface of the bottle. Due to the improved slipping property to the content and sustaining slipping property, the content can be quickly discharged and in all amounts so that the content can be all consumed.

<Gel-Like Coating 3>

In the present invention, the gel-like coating 3 formed on the surface of the base material 1 comprises an oily liquid and fine solid particles. Here, it is desired that the gel-like coating 3 has a thixotropic property.

The oily liquid used for forming the gel-like coating 3 exhibits slipping property to the water-containing substances and works as a lubricating agent.

The oily liquid must be a nonvolatile liquid having a small vapor pressure under the atmospheric pressure or must be a high-boiling liquid having a boiling point of, for example, not lower than 200° C. This is because if a volatile liquid is used, then the liquid easily volatilizes and extinguishes with the passage of time making it difficult to form the gel-like coating 3.

Further, the liquid must be the high-boiling liquid as described above, must be highly wettable for the surface of the base material 1 and must be capable of forming the gel-like coating 3 on the surface in a manner of being evenly and closely adhered thereto. From these points of view, the oily liquid must acquire an angle of contact (20° C.) of not more than 45 degrees with respect to the surface of the base material 1 and must have a viscosity (25° C.) of not more than 100 mPa·s. Namely, the gel-like coating 3 should be formed by using the oily liquid that satisfies the above-mentioned properties irrespective of if the surface of the base material 1 is formed by using a synthetic resin, a glass or a metal.

Among the oily liquids satisfying the above-mentioned properties, it is desired according to the present invention to use the one having a surface tension that is greatly different from that of the substance that is to be slipped down (e.g., the content in the container) since it exhibits further improved lubricating effect.

Namely, from the standpoint of improving the slipping property to viscous water-containing substances, it is desired to use an oily liquid having a surface tension lying in a range of 10 to 40 mN/m and, specifically, 16 to 35 mN/m. As such oily liquids, there can be representatively exemplified liquid paraffin, synthetic paraffin, fluorine-contained liquid, fluorine-contained surfactant, silicone oil, fatty acid triglyceride and various vegetable oils. An edible oil is preferred particularly when the substances for which the slipping property is to be exhibited are foods (such as mayonnaise, ketchup and the like).

Concrete examples of the edible oil include soy bean oil, rape oil, olive oil, rice oil, corn oil, safflower oil, sesame oil, palm oil, castor oil, avocado oil, coconut oil, almond oil, walnut oil, hazel oil and salad oil.

The fine solid particles used in combination with the oily liquid are to impart thixotropic property to the oily liquid and should have a grain size of not larger than 50 μm and, specifically, not larger than 30 μm. That is, in order that the solid particles form a network contruction in the oily liquid and impart a gel or a contruction close to a gel that exhibits such property as thixotropy, it is necessary that the solid particles have a fine grain size as described above. This is because the particles having a large grain size are not capable of forming a network contruction in which the particles are continuing to one another.

The grain size can be measured by, for example, a laser diffraction light scattering method or by the observation using a microscope. Namely, the grain size stands for a so-called secondary grain size (aggregated grain size).

In the present invention, the fine solid particles are capable of being homogeneously dispersed in the oily liquid to form the gel-like coating 3 that has thixotropic property. The fine solid particles can be formed by using various organic materials or inorganic materials so far as they have melting points that help maintain a solid state in an environment in which they are used and stored. From the standpoint of good affinity to the oily liquid, however, it is desired that the fine solid particles are rather organic particles than the inorganic particles such as metal particles or metal oxide particles. For instance, the fine solid particles are desirably formed of an olefin wax, a rice wax, a carnauba wax, various celluloses or an organic cured resin (e.g., cured product obtained by curing a polyfunctional acrylic monomer) and, most desirably, formed of the rice wax since it can be used for the foods without any limitation.

The gel-like coating 3 is prepared by mixing the above-mentioned oily liquid and the fine solid particles, and stirring them together under a strong shearing force. Namely, the mixture thereof may be strongly stirred together so as to form a network contruction of the fine solid particles.

It is desired that the thus obtained gel-like coating 3 has a viscosity of 35 to 250 mPa·S as measured by using a rotary viscometer at a rotational frequency of 20 rpm and 25° C. If the viscosity is smaller than 35 mPa·S, the gel-like coating 3 cannot be held on the base material 1 for extended periods of time and its slipping property decreases with the passage of time. If the viscosity is larger than 250 mPa·S, on the other hand, the slide-down speed decreases and the slipping performance may not be exhibited to a sufficient degree.

Further, the gel-like coating 3 prepared by mixing the fine solid particles in an amount of, for example, 5 parts by mass per 100 parts by mass of the oily liquid and by stirring them together, exhibits a viscosity of 124 mPa·s at a rotational frequency of 20 rpm and 243 mPa·s at a rotational frequency of 2 rpm, i.e., exhibits such a thixotropic property that the viscosity decreases with an increase in the rotational frequency. Thus upon imparting the thixotropic property, it is made possible to improve the initial slipping property and to sustain the slipping property to a greatly extended degree. For instance, if the thixotropy (difference in the viscosity) is small, the oil oozes out little on the surface despite the water-containing substance flows on the gel-like coating 3 and, therefore, the initial slipping property tends to decrease. Besides, the gel-like coating 3 cannot be stably held on the surface of the base material 1 and the slipping property tends to decrease conspicuously every time when the substance flows on the gel-like coating 3. Therefore, the slipping property cannot be continuously exhibited to a satisfactory degree.

To form the gel-like coating 3 having a viscosity lying within the above-mentioned range, it is necessary to suitably adjust the above-mentioned stirring temperature, shearing rate and stirring time. Usually, however, it is desired to mix the fine solid particles in an amount of about 0.5 to about 10 parts by mass and, specifically, about 1 to about 10 parts by mass per 100 parts by mass of the oily liquid. This makes it possible to prepare a desired gel-like coating 3 by conducting the stirring at a suitable shearing rate and for a suitable period of time.

The gel-like coating 3 can be formed by any means to meet the surface shape of the base material 1. Here, however, the gel-like coating 3 has the thixotropic property and can be easily formed by a spraying method. It is, therefore, desired that the gel-like coating 3 is formed by being sprayed onto the surface of the predetermined base material 1.

It is desired that the gel-like coating 3 is formed on the surface of the base material 1 in an amount of 1.00 to 3.70 mg/cm$^2$. If the amount is too small, the gel-like coating 3 becomes no more capable of exhibiting the slipping property or sustaining the slipping property to a satisfactory degree. Even if the gel-like coating 3 is formed in unnecessarily large amounts, on the other hand, the slipping property and sustaining the property cannot be improved any more but, rather, the cost increases and, besides, the gel-like coating 3 tends to split off the surface of the base material 1 due to its weight.

The above-mentioned structure of the present invention exhibits excellent slipping property to the viscous water-containing substances and sustains the slipping property. Therefore, the structure can be preferably used as a container for containing a viscous water-containing substance having a viscosity (25° C.) of not less than 100 mPa·s (as measured by using a tuning fork type viscometer) and, specifically, as a directly blow-formed container for containing viscous contents such as mayonnaise, ketchup, aqueous paste, honey, various sauces, mustard, dressing, jam, chocolate syrup, cosmetic such as lotion, liquid detergent, shampoo, rinse, etc.

EXAMPLES

The invention will now be described by way of the following Experimental Examples.

Described below are containers, gel-like coatings and contents used in Examples and Comparative Examples.
<Container>

There was provided a directly blow-formed multi-layer bottle having a multilayer structure of the following layer constitution and having a capacity of 400 g.

Inner layer: low-density polyethylene resin (LDPE)
Intermediate layer: ethylene-vinyl alcohol copolymer (EVOH)
Outer layer: low-density polyethylene resin (LDPE)
Adhesive layers (among the inner layer, intermediate layer and outer layer): acid-modified polyolefin
<Gel-Like Coating>
Oily liquid: Salad oil to which medium-chain fatty acid is added.
Viscosity: 33 mPa·s (25° C.),
Angle of contact (20° C.): 18 degrees
Solid particles: Carnauba wax By using a homogenizer, coating solutions were prepared by finely dispersing the above-mentioned solid particles in amounts as shown in Table 1 in the above-mentioned oily liquid at room temperature (25$t$), and were evenly applied in amounts as shown in Table 1 onto the inner surfaces of the containers by using an air spray device so as to form gel-like coatings.
<Measurements>
Angle of Contact;

The inner surface of the container was left to face upward, and 10 mg of the oily liquid used for forming the gel-like coating was dropped thereon. The angle of contact thereof was measured by using an instrument for measuring contact angles (DropMaster 700 manufactured by Kyowa Interface Science Co., Ltd.) at 20° C., 50% RH.
Viscosity;

The material to be measured was introduced into a beaker, and a spindle and a guard of a B-type digital viscometer were put into the material. While maintaining the temperature at 25° C., the spindle was turned at 20 rpm for one minute to measure the viscosity.
<Content>

An egg (50 g), 15 cc of vinegar and 2.5 cc of salt were mixed together and to which 150 cc of edible oil was, further, added to prepare a mayonnaise-like food for experiment. In Examples and Comparative Examples, the contents were prepared in required amounts and were used.

By using the contents of Examples and Comparative Examples, further, the slipping properties were evaluated in a manner as described below.
<Evaluating the Slipping Properties>

A spray nozzle was inserted in the bottle up to the bottom thereof and was pulled up while spraying the gel-like coating so as to be applied to the whole side wall surfaces starting from the bottom portion of the bottle. Into the bottle forming the gel-like coating on the inner surface thereof, 400 g of the mayonnaise-like food as the content was introduced in a customary manner. The mouth portion of the bottle was heat-sealed with an aluminum foil and was sealed with a cap to obtain a filled bottle.

The bottle filled with the content was stored at for one week (initial bottle).

The bottle was further stored for periods of time and at temperatures shown in Table 1. The thus stored bottle was pressed on its body portion, and the content was squeezed out up to its last drip through the mouth portion of the bottle. Thereafter, the air was introduced into the bottle to restore its original shape.

Next, the bottle was inverted (mouth portion down) and was stored for one hour. Thereafter, the body wall of the bottle was measured in regard to what extent the content has slid down (to what extent the content has no longer been adhered to the body wall portion). The content adhesion ratio was calculated in compliance with the following formula.

Content adhesion ratio (%)=(surface area on which the content is adhering/surface area of the body wall of the bottle)×100

From the content adhesion ratios calculated above, the slipping properties were evaluated on the following basis.

◯: The content adhesion ratio is less than 10%.

Δ: The content adhesion ratio is not less than 10% but is less than 50%.

X: The content adhesion ratio is not less than 50%.
<Measuring the Size of the Solid Particles>

The gel-like coating that was formed as observed by using a microscope, and the image thereof was processed to measure the grain sizes. A maximum grain size was regarded to be a grain size of the gel-like coating.

Examples 1 to 7

The gel-like coatings were applied onto the formed bottles in amounts as shown in Table 1 to evaluate their slipping properties.

Comparative Example 1

The oily liquid same as that of the gel-like coating was applied onto the formed bottle in an amount as shown in Table 1 to measure its slipping property.

Comparative Example 2

A solution obtained by mixing the oily liquid same as that of the gel-like coating and the solid particles (grain size, 85 μm) was applied to the formed bottle in an amount shown in Table 1 to evaluate its slipping property. The liquid that was prepared was not in a gel-like form since the solid particles were not so fine.

TABLE 1

| | Gel-like coating | | | | Evaluating the slipping property | | |
|---|---|---|---|---|---|---|---|
| | Ratio of solid particles (g/100 g of oily liquid) | Size of solid particles (μm) | Viscosity (mPa·s) | Amount applied (mg/cm²) | Initial bottle | Bottle stored at 40° C. for 2 weeks | Bottle stored at 40° C. for 2 months |
| Ex. 1 | 5 | 13 | 124 | 1.97 | ○ | ○ | ○ |
| Ex. 2 | 3 | 23 | 78 | ↑ | ○ | ○ | ○ |
| Ex. 3 | 1 | 25 | 52 | ↑ | ○ | ○ | ○ |
| Ex. 4 | 0.5 | 50 | 35 | ↑ | ○ | ○ | Δ |
| Ex. 5 | 10 | 17 | 248 | ↑ | ○ | ○ | ○ |
| Ex. 6 | 5 | 13 | 124 | 1.00 | ○ | ○ | ○ |
| Ex. 7 | 5 | 13 | 124 | 3.70 | ○ | ○ | ○ |
| Comp. Ex. 1 | 0 | — | 33 | 1.97 | ○ | Δ | X |
| Comp. Ex. 2 | 5 | 85 | 33 | 1.97 | ○ | Δ | X |

The results tell that upon forming the gel-like coating on the inner surface of the bottle, improved slipping property is exhibited to the content and, besides, the slipping property is maintained even after the bottle is stored at high temperatures for extended periods of time. It is, therefore, learned that the formed body forming the gel-like coating on the inner surface thereof exhibits excellent slipping property to the content and maintains the slipping property over extended periods of time. If the gel-like coating is prepared by simply mixing the oily liquid and the solid particles together, the slipping property decreases with the passage of time down to the case of when there are no solid particles. It is, therefore, learned that what is important is that the solid particles are the fine solid particles and the liquid assumes the form of a gel.

DESCRIPTION OF REFERENCE NUMERALS

1: base material
3: gel-like coating

The invention claimed is:

1. A structure forming a gel coating on a surface of a base material that is formed in a predetermined shape, said gel coating including fine solid particles of a grain size of not more than 50 μm and an oily liquid;
    (a) said gel coating has a viscosity of 35 to 250 mPa·s (25° C.) as measured at a rotational frequency of 20 rpm; and
    (b) said base material is a container and said gel coating is formed on an inner surface thereof with which a content comes in contact.

2. The structure according to claim 1, wherein said oily liquid has an angle of contact (20° C.) of not more than 45 degrees with respect to the surface of said base material and a viscosity (25° C.) of not more than 100 mPa·s.

3. The structure according to claim 2, wherein said oily liquid is an edible oil.

4. The structure according to claim 1, wherein said fine solid particles are fat particles.

5. The structure according to claim 1, wherein said gel coating is formed on the surface of the base material in an amount of 1.00 to 3.70 mg/cm².

6. The structure according to claim 1, wherein the surface of said base material is formed of a synthetic resin or a glass.

* * * * *